United States Patent
Tanaka et al.

(10) Patent No.: US 7,410,690 B2
(45) Date of Patent: *Aug. 12, 2008

(54) ULTRAFINE MIXED-CRYSTAL OXIDE, PRODUCTION PROCESS AND USE THEREOF

(75) Inventors: Jun Tanaka, Toyama (JP); Shinichiro Tomikawa, Nagano (JP)

(73) Assignee: Showda Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/365,853

(22) Filed: Mar. 2, 2006

(65) Prior Publication Data

US 2006/0147713 A1    Jul. 6, 2006

Related U.S. Application Data

(62) Division of application No. 10/388,739, filed on Mar. 17, 2003, now Pat. No. 7,083,852, which is a division of application No. 09/775,549, filed on Feb. 5, 2001, now Pat. No. 6,572,964.

(60) Provisional application No. 60/214,426, filed on Jun. 28, 2000.

(30) Foreign Application Priority Data

Feb. 4, 2000    (JP) ............................. 2000-032829

(51) Int. Cl.
*B32B 5/16*    (2006.01)
*C08K 3/22*    (2006.01)
*C01F 7/02*    (2006.01)

(52) U.S. Cl. ................ 428/329; 428/323; 428/328; 428/372; 428/402; 524/413; 524/492; 524/497

(58) Field of Classification Search .............. None
See application file for complete search history.

(56) References Cited

U.S. PATENT DOCUMENTS

| | | |
|---|---|---|
| 3,640,745 A | 2/1972 | Darr et al. |
| 3,650,694 A | 3/1972 | Allen |
| 3,663,283 A | 5/1972 | Hebert et al. |
| 4,013,782 A | 3/1977 | Powell et al. |
| 4,053,577 A | 10/1977 | Arkless |
| 4,721,610 A | 1/1988 | Yoshida et al. |
| 4,746,638 A | 5/1988 | Hori et al. |
| 5,380,687 A | 1/1995 | Mangold et al. |
| 5,451,390 A | 9/1995 | Hartmann et al. |
| 5,599,519 A | 2/1997 | Haddow |

(Continued)

FOREIGN PATENT DOCUMENTS

EP    0 595 078 A2    10/1993

(Continued)

*Primary Examiner*—Monique R Jackson
(74) *Attorney, Agent, or Firm*—Sughrue Mion, PLLC (57) ABSTRACT

An ultrafine mixed-crystal oxide, wherein the oxide has a change in absorbance of about 5 (/hr) or less when measured in such a manner that said oxide is dispersed at a concentration of 0.067% in a solvent of a 98% glycerin in which Sunset Yellow is dissolved at a concentration of 0.02%, thereby preparing a dispersion, and the dispersion is irradiated with a BLB lamp (ultraviolet light) with an intensity of 1.65 mW/cm$^2$ to obtain said change in absorbance ($\Delta$OD) at 490 nm.

16 Claims, 1 Drawing Sheet

U.S. PATENT DOCUMENTS

| | | |
|---|---|---|
| 5,753,025 A | 5/1998 | Bettler et al. |
| 5,840,267 A | 11/1998 | Saegusa |
| 6,572,964 B2 | 6/2003 | Tanaka et al. |
| 6,830,742 B2 | 12/2004 | Tanaka et al. |
| 6,835,455 B2 | 12/2004 | Tanaka et al. |

FOREIGN PATENT DOCUMENTS

| | | |
|---|---|---|
| GB | 1 207 860 | 10/1970 |
| JP | 50-115190 | 2/1974 |
| JP | 50-115190 A | 9/1975 |
| JP | 55-80721 A | 6/1980 |
| JP | 6-171941 A | 6/1994 |
| JP | 06-191848 | 7/1994 |
| JP | 06-199516 | 7/1994 |
| JP | 9-511985 A | 12/1997 |
| JP | 10-509687 A | 9/1998 |
| JP | 11-509888 A | 8/1999 |
| WO | WO 96/00699 A | 1/1996 |

ULTRAFINE MIXED-CRYSTAL OXIDE, PRODUCTION PROCESS AND USE THEREOF

CROSS-REFERENCE TO RELATED APPLICATION

This is a divisional of application Ser. No. 10/388,739 filed on Mar. 17, 2003 now U.S. Pat. No. 7,083,852 which is a divisional of application Ser. No. 09/775,549 filed Feb. 5, 2001, now U.S. Pat. No. 6,572,964, which claims benefit of Provisional Application No. 60/214,426 filed Jun. 28, 2000; the above noted prior applications are all hereby incorporated by reference.

TECHNICAL FIELD

The present invention relates to an ultrafine mixed-crystal oxide obtained by a vapor phase method, and the production process thereof. More specifically, the present invention relates to an ultrafine mixed-crystal oxide with a mixed-crystal state, prepared from a mixture selectively comprising a plurality of chlorides, bromides, and iodides of titanium, silicon, and aluminum with an arbitrary composition ratio, the production process and the use thereof.

BACKGROUND ART

The fields of industrial application of the ultrafine oxides have been expanding considerably in recent years. For instance, ultrafine titanium oxide is being extensively studied as an ultraviolet-shielding agent, an additive for a silicone rubber, and a photocatalyst. In particular, the application for cosmetics attracts special attention due to the ultraviolet shielding effect of ultrafine titanium oxide, and, in light of the photocatalytic properties of the ultrafine titanium oxide, some attention is also being paid to the application for prevention of fouling, sterilization, and deodorizing. Such applications are supported by the advantages of ultrafine titanium oxide in terms of safety, processability, functional characteristics, and durability. The ultrafine particles have not been exactly defined, but are generally regarded as fine particles with a primary particle diameter of about 0.1 µm or less.

The specific functions of titanium oxide, that is, scattering and absorption of ultraviolet light, are noteworthy. It is more noticeable that ultrafine particles of titanium oxide are favorably provided with the above-mentioned two functions in combination. For instance, ultrafine titanium oxide with a primary particle diameter of about 80 nm can work to effectively scatter ultraviolet light. In addition, it is known that such ultrafine particles of titanium oxide can effectively absorb ultraviolet light with a wavelength of about 400 nm or less and be excited to generate electrons and/or holes in the portion adjacent to the surface of the particle, thereby exhibiting such photocatalytic performance as to carry out the prevention of fouling, sterilization, and deodorizing, as mentioned above.

However, when titanium oxide having such functions is used for cosmetic applications in practice, there is the possibility that the titanium oxide works improperly unless subjected to a surface treatment (coating). This is because the electrons and holes caused by photo-excitation generate various radicals when allowed to react with oxygen and water in the air, so that they work to decompose organic materials in the air.

Titanium oxide is also used as a high-performance dielectric material. For example, titanium oxide is subjected to a solid phase reaction with barium carbonate at 1,200° C. in accordance with the following reaction formula, thereby providing barium titanate serving as a dielectric material.

$$BaCO_3 + TiO_2 \rightarrow BaTiO_3 + CO_2$$

In this case, barium carbonate decomposes at around 700° C. to generate BaO with high tendency of ionization, which is diffused into $TiO_2$ particles with covalent bonding characteristics to form a solid solution, thereby producing barium titanate. The particle size of the barium titanate is determined by the crystalline size of the $TiO_2$ in the course of the reaction. Therefore, the crystallinity and the particle size of the titanium oxide serving as the raw material become significant. To cope with the requirement for a small-size ceramic condenser with a high dielectric constant, there is an increasing demand for ultrafine particles of barium titanate, and consequently, for ultrafine particles of titanium oxide as a raw material.

However, the growth of titanium oxide particles with a particle size of 0.1 µm or less is striking at the above-mentioned reaction temperature of about 700° C., so that there is the problem that such titanium oxide particles cannot contribute to the provision of ultrafine particles of barium titanate. Ultrafine particles of titanium oxide for achieving the above-mentioned object is desired.

As an example of a method for producing fine particles of a composite containing titanium oxide, a production process is known for finely-divided particles of silica-titania composite material, that is, a production process of allowing a mixture of gaseous halogenated silicon and gaseous halogenated titanium to react with oxidizing gas containing an oxygen at 900° C. or more (Japanese Laid-Open Patent Application No. 50-115190). According to this method, the mixture of gases serving as the raw material is subjected to a reaction under conditions of a high temperature of 900° C. or more without preheating. The resultant composite particles have such a structure that crystalline $TiO_2$ particles are always deposited on the surface of the composite particles.

Japanese Patent No. 2503370 (European Patent No. 595078) discloses that a mixed oxide of titanium oxide, aluminum oxide, and silicon oxide can be produced by flame hydrolysis (at a reaction temperature of 1000 to 3000° C.) using chlorides as raw materials. The flame hydrolysis produces a mixed oxide of $Al_2O_3$ and $TiO_2$, or a mixed oxide of $SiO_2$ and $TiO_2$. Similarly, Japanese Patent No. 2533067 (European Patent No. 585544) discloses manufacture of a mixed oxide of aluminum oxide and silicon oxide by flame hydrolysis.

As previously mentioned, the production process for a metal oxide by a vapor phase method, or the production process for a metal oxide or mixed metal oxide by flame hydrolysis is conventionally known. However, the growing mechanism of the product particles that is, in general, seriously influenced by the reaction temperature, the gas flow velocity, the cooling rate, or the like, has not been sufficiently clarified.

DISCLOSURE OF THE INVENTION

In light of the applications of the previously mentioned ultrafine metal oxides, objects of the present invention are to provide a convenient production process for a surface-modified ultrafine mixed-crystal oxide, and to provide the ultrafine mixed-crystal oxide obtained by the process.

The inventors of the present invention have conducted an intensive investigation in view of the prior art. As a result, the above-mentioned problems were solved by producing an ultrafine mixed-crystal oxide comprising primary particles with a mixed crystal state having a BET specific surface area of about 10 to about 200 m²/g in such a manner that a mixed gas (hereinafter referred to as "a mixed halogenated metal gas") comprising at least two compounds selected from the group consisting of chlorides, bromides, and iodides of titanium, silicon (In the present invention, silicon element is grouped together with a metal element), and aluminum and an oxidizing gas are independently preheated to about 500° C. or more prior to a reaction.

Namely, the present invention provides:

(1) a process for producing an ultrafine mixed-crystal oxide characterized by producing an ultrafine mixed-crystal oxide comprising primary particles in a mixed crystal state with a BET specific surface area of about 10 to about 200 m²/g, comprising the step of subjecting a halogenated metal to high temperature oxidation with an oxidizing gas to produce a metal oxide by a vapor phase production method, wherein the halogenated metal is in the form of a mixed gas (a mixed halogenated metal gas) comprising at least two compounds each having a different metal element selected from the group consisting of chlorides, bromides, and iodides of titanium, silicon, and aluminum, and the mixed halogenated metal gas and the oxidizing gas are independently preheated to about 500° C. or more prior to a reaction;

(2) the production process of the ultrafine mixed-crystal oxide according to the aforementioned item (1), wherein the mixed halogenated metal gas is prepared by independently vaporizing at least two compounds each having a different metal element selected from the group consisting of chlorides, bromides, and iodides of titanium, silicon, and aluminum, and mixing the compounds in a gaseous state;

(3) the production process of the ultrafine mixed-crystal oxide according to the aforementioned item (1) or (2), wherein the group consisting of chlorides, bromides, and iodides of titanium, silicon, and aluminum consists of $TiCl_2$, $TiCl_3$, $TiCl_4$, $TiBr_3$, $TiBr_4$, $SiCl_4$, $Si_2Cl_6$, $Si_3Cl_8$, $Si_3Cl_{10}$, $Si_5Cl_{12}$, $Si_{10}Cl_{12}$, $SiBr_4$, $Si_2Br_6$, $Si_3Br_8$, $Si_4Br_{Si2}I_6$, $SiCl_2I_2$, $SiClI_3$, $SiBr_3I$, $SiHI_3$, $SiCl_3I$, $SiH_3Br$, $SiH_2Br_2$, $SiHBr_3$, $SiCl_3Br$, $SiCl_2Br_2$, $SiClBr_3$, $AlCl_3$, $AlBr_3$, and $AlI_3$;

(4) the production process of the ultrafine mixed-crystal oxide according to the aforementioned item (1), wherein the mixed halogenated metal gas and the oxidizing gas which are independently preheated to about 500° C. or more are separately supplied to a reaction tube at a flow velocity of about 10 m/sec or more to carry out the reaction;

(5) the production process of the ultrafine mixed-crystal oxide according to the aforementioned item (1), wherein the reaction is; carried out with the mixed halogenated metal gas and the oxidizing gas being retained in the reaction tube for about 1 second or less under the condition that the temperature in the reaction tube exceeds about 600° C.;

(6) the production process of the ultrafine mixed-crystal oxide according to the aforementioned item (1), wherein the gases in the reaction tube have an average flow velocity of about 5 m/sec or more;

(7) the production process of the ultrafine mixed-crystal oxide according to the aforementioned item (1), wherein the preheated mixed halogenated metal gas and oxidizing gas cause turbulent flow when supplied to the reaction tube;

(8) the production process of the ultrafine mixed-crystal oxide according to the aforementioned item (1) or (4), wherein the mixed halogenated metal gas and the oxidizing gas are supplied to the reaction tube through a coaxial parallel flow nozzle which has an internal tube with an inner diameter of about 50 mm or less;

(9) the production process of the ultrafine mixed-crystal oxide according to the aforementioned item (1), wherein a concentration of the aforementioned mixed halogenated metal gas is in a range of about 10 to 100% by volume;

(10) the production process of the ultrafine mixed-crystal oxide according to the aforementioned item (1) or (4), wherein the aforementioned mixed halogenated metal gas and oxidizing gas are preheated to about 800° C. or more;

(11) an ultrafine mixed-crystal oxide produced by the process according to the aforementioned item (1);

(12) the ultrafine mixed-crystal oxide as described in the aforementioned item (11), wherein the oxide has a BET specific surface area of about 10 to about 200 m²/g, and comprises primary particles with a mixed crystal having a titanium-oxygen-silicon bond;

(13) the ultrafine mixed-crystal oxide as described in the aforementioned item (11), wherein the oxide has a BET specific surface area of about 10 to about 200 m²/g, and comprises primary particles with a mixed crystal having a titanium-oxygen-aluminum bond;

(14) the ultrafine mixed-crystal oxide as described in the aforementioned item (12) or (13), wherein the oxide has a BET specific surface area decreasing ratio of about 10% or less after heating at about 800° C. for one hour;

(15) the ultrafine mixed-crystal oxide as described in the aforementioned item (12) or (13), wherein the oxide has a change in absorbance of about 5 (/hr) or less when measured in such a manner that the oxide is dispersed at a concentration of 0.067% in a solvent of a 98% glycerin in which Sunset Yellow is dissolved at a concentration of 0.02%, thereby preparing a dispersion, and the dispersion is irradiated with a BLB lamp (ultraviolet light) with an intensity of 1.65 mW/cm² to obtain the change in absorbance ($\Delta OD$) at 490 nm;

(16) the ultrafine mixed-crystal oxide as described in the aforementioned item (11), wherein the oxide has a BET specific surface area of about 10 to about 200 m²/g, and comprises primary particles with a mixed crystal having an aluminum-oxygen-silicon bond;

(17) the ultrafine mixed-crystal oxide as described in the aforementioned item (12), (13) or (16), wherein the oxide has an A/B ratio is about 0.001 or less when A is the content (%) of chlorine, and B is the BET specific surface area (m²/g);

(18) an ultrafine mixed-crystal oxide composition characterized by comprising the ultrafine mixed-crystal oxides as described in the aforementioned item (11);

(19) an aqueous slurry characterized by comprising the ultrafine mixed-crystal oxide as described in the aforementioned item (11);

(20) an organic polymer composition characterized by comprising the ultrafine mixed-crystal oxide as described in the aforementioned item (11);

(21) the organic polymer composition comprising the ultrafine mixed-crystal oxide as described in the aforementioned item (20), wherein an organic polymer in the organic polymer composition is at least one kind of organic polymer selected from the group consisting of a synthetic thermoplastic resin, a synthetic thermosetting resin, and a natural resin;

(22) the organic polymer composition comprising the ultrafine mixed-crystal oxide as described in the aforementioned item (20), wherein a concentration of the ultrafine mixed-crystal oxide in the organic polymer composition is in a range of about 0.01 to about 80 mass % of total mass of the comopsite;

(23) a paint using the organic polymer composition as described in the aforementioned item (20);

(24) a compound using the organic polymer composition as described in the aforementioned item (20);

(25) a master batch for a molded material selected from fiber, film, or molded plastic, using the organic polymer composition comprising the ultrafine mixed-crystal oxide in a high concentration as described in the aforementioned item (20);

(26) a molded material characterized in that the molded material is molded from the organic polymer composition comprising the ultrafine mixed-crystal oxide as described in the aforementioned item (20);

(27) the molded material as described in the aforementioned item (26), wherein the molded material is a fiber, a film, and a plastic molded material; and (28) a structural material characterized by including the ultrafine mixed-crystal oxide as described in the aforementioned item (11) on a surface of the structural material.

DETAILED DESCRIPTION OF THE INVENTION

The present invention will now be explained in detail.

The present invention relates to a process for producing an ultrafine mixed-crystal oxide characterized by producing an ultrafine mixed-crystal oxide comprising primary particles in a mixed crystal state with a BET specific surface area of about 10 to about 200 m$^2$/g, comprising the step of subjecting a halogenated metal to high temperature oxidation with an oxidizing gas to produce a metal oxide by a vapor phase production method, wherein the halogenated metal is in the form of a mixed halogenated metal gas comprising at least two compounds having a different metal atoms selected from the group consisting of chlorides, bromides, and iodides of titanium, silicon, and aluminum, and the mixed halogenated metal gas and the oxidizing gas are independently preheated to about 500° C. or more prior to a reaction.

In the above-mentioned production process of the ultrafine mixed-crystal oxide, it is preferable that the mixed halogenated metal gas comprise at least two compounds each having a different metal element selected from the group consisting of chlorides, bromides, and iodides of titanium, silicon, and aluminum. When the mixed halogenated metal gas is supplied to a reaction tube, it is preferable that the halogenated metals be independently vaporized into a gaseous state, followed by mixing in the gaseous state. As the oxidizing gas, oxygen, water vapor, or a mixed gas comprising oxygen and water vapor is used.

The chlorides, bromides, and iodides of titanium, silicon, and aluminum for use in the present invention are not limited. Any halogenated metal that can at least produce the corresponding halogenated metal gas when preheated to about 500° C. or more is usable. For example, $TiCl_2$, $TiCl_3$, $TiCl_4$, $TiBr_3$, $TiBr_4$, $SiCl_4$, $Si_2Cl_6$, $Si_3Cl_8$, $Si_3Cl_{10}$, $Si_5Cl_{12}$, $Si_{10}Cl_{12}$, $SiBr_4$, $Si_2Br_6$, $Si_3Br_8$, $Si_4Br_{Si/2}I_6$, $SiCl_2I_2$, $SiClI_3$, $SiBr_3I$, $SiHI_3$, $SiCl_3I$, $SiH_3Br$, $SiH_2Br_2$, $SiHBr_3$, $SiCl_3Br$, $SiCl_2Br_2$, $SiClBr_3$, $AlCl_3$, $AlBr_3$, and $AlI_3$ can be given as examples. Of these examples, $TiCl_4$, $TiBr_4$, $SiCl_4$, and $AlCl_3$ are particularly preferable.

In the present invention, the above-mentioned mixed halogenated metal gas and oxidizing gas are required to be independently preheated to at least about 500° C. or more, preferably about 800° C. or more before the reaction. When the preheating temperatures of the mixed halogenated metal gas and the oxidizing gas are lower than about 500° C., uniform nucleation is decreased, and the reactivity is reduced. Therefore, it is difficult to produce ultrafine particles, and the residual content of chlorine is increased after dechlorination.

In the present invention, it is desirable that the mixed halogenated metal gas and the oxidizing gas be separately supplied to a reaction tube at a flow velocity of about 10 m/sec or more, more preferably about 30 m/sec or more. In addition, it is preferable to carry out the reaction of these gases in such a manner that the gases are retained in the reaction tube under the condition of high temperatures of about 600° C. or more to have a reaction time (which will also be hereinafter referred to as "high-temperature residence time") of about 1 second or less.

The inventors of the present invention have intensively studied the growing mechanism of particles in the vapor phase method. As a result, an oxide can be favorably obtained in the form of ultrafine particles by controlling both growing stages of the chemical vapor deposition (CVD) growing mechanism and the particle growing mechanism due to coalescence of particles by collision and sintering which are factors having an effect on the particle growth, to be curtailed. In other words, with respect to the former factor for growth, the growth of an oxide can be controlled when the chemical reactivity (reaction rate) is enhanced by elevating the preheating temperature. Concerning the latter factor for particle growth, the growth caused by sintering or the like can be inhibited when the high-temperature residence time is minimized by rapid cooling and diluting after completion of the CVD. Under such production conditions, an ultrafine mixed-crystal oxide with a BET specific surface area of about 10 to about 200 m$^2$/g, preferably about 10 to about 100 m$^2$/g, can be obtained.

It is preferable that the flow velocities of the mixed halogenated metal gas and the oxidizing gas be about 10 m/sec or more when the gases are introduced into the reaction tube. This is because the mixing of gases can be promoted by increasing the flow velocities. When the gases have temperatures of about 500° C. or more on entering the reaction tube, the reaction is completed simultaneously with the mixing step, so that uniform nucleation is promoted. In addition, it is possible to curtail the CVD-governed particle growing zone.

In the present invention, it is preferable that the material gas be introduced into the reaction tube in a condition that the gases introduced there are thoroughly mixed. As long as the gases are sufficiently mixed, the fluid state of gas in the reaction tube is not particularly limited. For example, a fluid state capable of causing turbulent flow is preferable. There may exist a spiral flow.

In the present invention, once the gases are supplied to the reaction tube, the larger the flow velocities of the gases in the reaction tube the better in order to perfectly mix the gases. In particular, it is preferable that the average flow velocity be about 5 m/sec or more. When the flow velocity of each gas in the reaction tube is about 5 m/sec or more, the gases can be thoroughly mixed in the reaction tube.

As a nozzle for introducing the material gas into the reaction tube, nozzles that can provide a coaxial parallel flow, oblique flow, or cross flow are employed, but not limited thereto. In general, the coaxial parallel flow nozzle is preferably employed from the viewpoint of design because the structure thereof is simpler although the coaxial parallel flow nozzle is inferior to other nozzles that can provide oblique flow or cross flow in terms of mixing performance. For example, when the coaxial parallel flow nozzle is employed, a chloride-containing-gas is introduced into the internal tube, and the oxidizing gas is introduced into the external tube. In this case, it is preferable that the internal tube have a diameter of about 50 mm or less, and more preferably about 50 mm to about 10 mm, from the viewpoint of mixing of gases.

The reaction in the reaction tube is an exothermic reaction, and the reaction temperature is higher than the sintering temperature for the resulting ultrafine titanium oxide. Although heat is lost by radiation from the reaction vessel, sintering of the resulting ultrafine particles proceeds to promote particle growth unless the reaction product is rapidly cooled after the reaction. In the present invention, it is preferable to set the high-temperature residence time at about 600° C. or more in the reaction tube to about 1 second or less, followed by rapid cooling.

To rapidly cool the particles after the reaction, there are the methods of introducing large quantities of cooling air or nitrogen gas or the like into the reaction mixture after the reaction, and of spraying water thereto.

Figure 1:
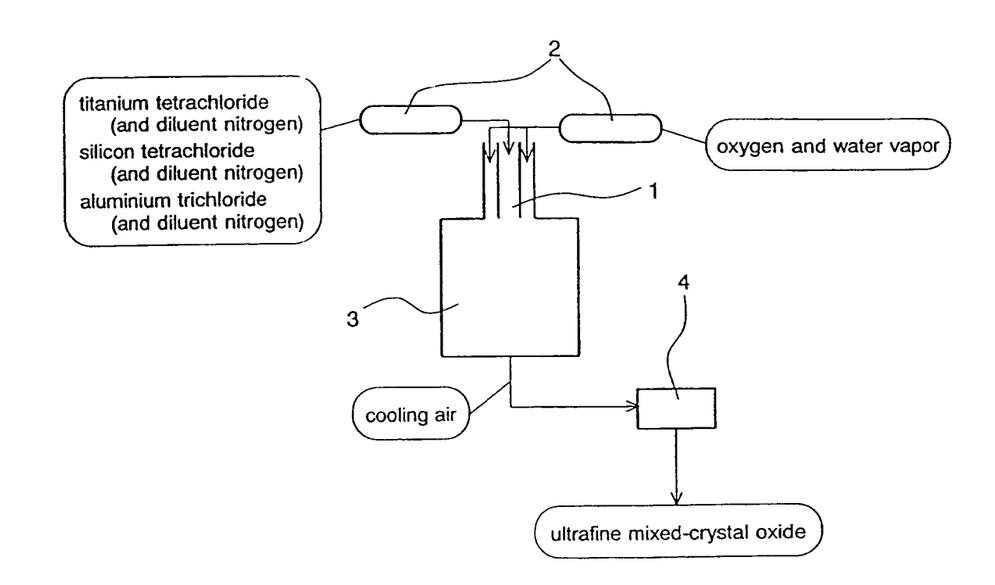
FIG. 1 is a schematic diagram of one example of a reaction tube with a coaxial parallel flow nozzle, which tube is preferably used in the present invention.

FIG. 1 is a schematic diagram of a reaction tube provided with a coaxial parallel flow nozzle used for the production of the ultrafine mixed-crystal oxide according to the present invention. A mixed halogenated metal gas is preheated to a predetermined temperature in a preheater 2, and introduced into a reaction tube 3 through an internal tube of a coaxial parallel flow nozzle 1. An oxidizing gas is preheated to a predetermined temperature in a preheater 2, and introduced into the reaction tube 3 through an external tube of the coaxial parallel flow nozzle 1. The gases introduced into the reaction tube are mixed to carry out the reaction. After that, the mixed gases are rapidly cooled with a cooling gas, and sent to a bag filter 4 to collect the ultrafine mixed-crystal oxide particles.

The material gas may be made of 100% by volume of the above-mentioned mixed halogenated metal gas. Alternatively, the mixed halogenated metal gas may be diluted with an inert gas to have a concentration of about 10 vol. % or more and less than 100%, preferably a concentration of about 20 vol. % or more and less than 100 vol. %. When the material gas comprises the mixed halogenated metal gas at a concentration (a total concentration of halogenated metal gas) of about 10 vol. % or more, uniform nucleation can be increased and the reactivity is enhanced. As the above-mentioned inert gas, any inert gas that is not reactive with the mixed halogenated metal and is not oxidized may be selected. More specifically, nitrogen and argon are preferable diluent gases.

The ultrafine mixed-crystal oxide obtained by the production process according to the present invention will now be explained. The ultrafine mixed-crystal oxide of the present invention has a BET specific surface area of about 10 to about 200 m$^2$/g. In the case where at least two kinds of compounds containing titanium and silicon are used for the mixed halogenated metal gas serving as the raw material in the production process of the present invention, there can be obtained an ultrafine mixed-crystal oxide comprising primary particles in a mixed crystal state with a titanium-oxygen-silicon bond. The above-mentioned ultrafine mixed-crystal oxide has an average primary particle diameter of about 0.008 to about 0.1 µm, preferably about 0.015 to about 0.1 µm.

The BET specific surface area decreasing ratio obtained after heating was evaluated as an indication of the resistance to sintering properties of the ultrafine mixed-crystal oxide (the measuring method is described later). As a result, the ultrafine mixed-crystal oxide comprising the above-mentioned titanium-oxygen-silicon bond has the characteristic that the BET specific surface area decreasing ratio is about 10% or less after the oxide is heated at about 800° C. for one hour.

With respect to the ultrafine mixed-crystal oxide of the present invention, when at least two kinds of compounds containing an element of titanium and aluminum are used for the mixed halogenated metal gas serving as the raw material, an ultrafine mixed-crystal oxide comprising primary particles in a mixed crystal state with a titanium-oxygen-aluminum bond can be obtained. In this case, the ultrafine mixed-crystal oxide comprising the above-mentioned titanium-oxygen-aluminum bond has the characteristic that the BET specific surface area decreasing ratio is 10% or less after the oxide is heated at about 800° C. for one hour.

Further, with respect to the ultrafine mixed-crystal oxide of the present invention, when at least two kinds of compounds containing aluminum and silicon are used for the mixed halogenated metal gas serving as the raw material, an ultrafine mixed-crystal oxide comprising primary particles in a mixed crystal state with an aluminum-oxygen-silicon bond can be obtained. In this case, the ultrafine mixed-crystal oxide comprising the above-mentioned aluminum-oxygen-silicon bond has the characteristic that the BET specific surface area decreasing ratio is about 10% or less after the oxide is heated at about 800° C. for one hour.

As an indication of photo-activity of the ultrafine mixed-crystal oxide according to the present invention, the ultrafine mixed-crystal oxide (for example, comprising primary particles in a mixed-crystal state with the titanium-oxygen-silicon bond, titanium-oxygen-aluminum bond, or silicon-oxygen-aluminum bond) were characterized with regard to the decreasing rate of dye absorbance under ultraviolet light irradiation. As a result, the ultrafine mixed-crystal oxide of the present invention is characterized by a change in absorbance of about 5 (/hr) or less when measured in such a manner that Sunset Yellow (dye) is dissolved at a concentration of 0.02% and the oxide is dispersed at a concentration of 0.067% in a solvent of a 98% glycerin, and the resultant dispersion is irradiated with a BLB lamp (ultraviolet light lamp) with an intensity of 1.65 mW/cm$^2$ to obtain the change in absorbance (ΔOD) at 490 nm.

In addition, it is surprisingly confirmed that the content of chlorine remaining in the oxide obtained after a dechlorination step is extremely low when silicon oxide exists in the oxide, as compared with the case where the oxide comprises no silicon oxide.

According to the present invention, in the ultrafine mixed-crystal oxide in a mixed-crystal state having any of the above-mentioned bonds, it is preferable that the A/B ratio be about 0.001 or less when A is the content (%) of chlorine, and B is the BET specific surface area (m$^2$/g).

The ultrafine mixed-crystal oxide obtained by the production process of the present invention may have a core/shell structure, which is preferably made of a crystalline compounded structure comprising different metal oxides. For instance, there are observed a TiO$_2$-rich phase in the core, and a SiO$_2$-rich phase in the shell in a titanium-silicon based ultrafine mixed-crystal oxide comprising the primary particle in a mixed-crystal state having a titanium-oxygen-silicon bond.

The ultrafine mixed-crystal oxide of the present invention can be used as a pigment, a dielectric raw material or an additive in cosmetics and clothing, and as an ultraviolet shielding agent and an abrasive in a variety of compositions such as silicone rubber and paper. A titanium-containing silicon or aluminum based mixed-crystal oxide can be used as a photocatalytic powder with a controlled photocatalytic effect. This is because such an oxide can reduce or magnify the photocatalytic properties peculiar to titanium oxide.

The aqueous slurry of the present invention means aqueous dispersant comprising the ultrafine mixed-crystal oxide. No particular limitation is imposed on an amount of the ultrafine mixed-crystal oxide contained in said slurry. For example, the amount is preferable to be in a range of about 0.01 to about 50 mass %, more preferably about 1 to about 40 mass %. When the amount of the ultrafine mixed-crystal oxide contained in the slurry is less than about 0.01 mass %, sufficient properties of the ultrafine mixed-crystal oxide can not be obtained. On the other hand when the amount of the ultrafine mixed-crystal oxide contained in the slurry is more than about 50 mass %, it results in arising problems of increasing viscosity and economical disadvantage.

To this aqueous dispersant (slurry), arbitrary amount of binder is added to produce a coating agent. A structural material containing the ultrafine mixed-crystal oxide on its surface is produced by painting the coating agent on a surface of various structural materials described later. In the present invention, no particular limitation is imposed on the binder material, both organic and inorganic binder can be preferably used. Specific examples of the organic binder include poly (vinyl alcohol), melamine resin, urethane resin, celluloid, chitin, starch sheet, polyacrylamide, and acrylamide. Examples of the inorganic binder include zirconium compound such as zirconium oxychloride, zirconium hydroxychloride, zirconium nitrate, zirconium sulfate, zircomium acetate, zirconium ammonium carbonate, zirconium propionate; silicon compound such as silane alkoxide, silicate; and metal alkoxide such as aluminum alkoxide, titanium alkoxide.

The amount of the binder added in the coating agent, for example, is preferably in a range of about 0.01 to about 20 mass %, more preferably about 1 to about 10 mass %. When the binder content is less than about 0.01 mass %, sufficient adhesive property after coating treatment can not be obtained. When the binder content is more than about 20 mass %, it results in arising problems of increasing viscosity and economical disadvantage.

The ultrafine mixed-crystal oxide of the present invention can be added in a organic polymer to produce a composition for use. The organic polymer to be used includes a synthetic thermoplastic resin, a synthetic thermosetting resin, and a natural resin etc. Specific examples of the organic polymer include polyolefin such as polyethylene, polypropylene, and polystyrene; polyamide such as nylon 6, nylon 66, and aramid; polyester such as polyethylene terephthalate, and unsaturated polyester; polyvinylchloride, polyvinylidene chloride, polyethylene oxide, polyethylene glycol, silicon resin, poly (vinyl alcohol), vinyl acetal resin, polyacetate, ABS resin, epoxy resin, vinyl acetate resin, cellulose and cellulose derivatives such as rayon, urethane resin, polyurethane resin, polycarbonate resin, urea resin, fluororesin, poly(vinylidene fluoride), phenol resin, cellulloid, chitin, starch sheet, acryl resin, melamine resin, alkyd resin.

The organic polymer composition containing the ultrafine mixed-crystal oxide of the present invention can be used as a paint(coating composition), a compound, and a masterbatch. A concentration of the ultrafine mixed-crystal oxide in the organic polymer composition based on a total mass of said composition is preferably about 0.01 to about 80 mass %, more preferably about 1 to about 50 mass %.

In the present invention, a molded material can be obtained by molding the above described polymer composition. The molded composition include fiber, film, and molded plastic.

Further, the organic polymer composition of the present invention having superior durability can be used as a coating composition for a structural material such as a wall material, a glass, a signboard, and a concrete for construction of the road. when the coating composition is applied to structural materials(organic material) such as paper, plastics, fabric, and wood; or to vihicles, it can be free of deterioration or defect of the coating.

BEST MODE FOR CARRYING OUT THE INVENTION

The present invention will now be explained in more detail with reference to the following examples, but the present invention is not particularly limited by these examples.

<Evaluation of Resistance to Sintering Properties>

The BET specific surface area decreasing ratio after heating the oxide was determined as an indication of the resistance to sintering properties of the ultrafine mixed-crystal oxide according to the present invention.

1 g of a raw material powder was placed in an aluminum crucible and heated at 800° C. for one hour in a siliconit furnace. After the powder was cooled to room temperature, the BET specific surface area was measured. When the BET specific surface area of the raw material powder is represented by B1 ($m^2/g$) and the BET specific surface area after heating is represented by B2 ($m^2/g$), the BET specific surface area decreasing ratio is defined in accordance with the following formula:

$$\text{BET specific surface area decreasing ratio} = \{1-(B2/B1)\} \times 100(\%)$$

The smaller the BET specific surface area decreasing ratio, the superior the resistance to the sintering properties to be evaluated.

<Evaluation of Photo-activity>

To evaluate the photo-activity of the ultrafine mixed-crystal oxide according to the present invention, the dye absorbance decreasing rate by ultraviolet irradiation was employed as an indication.

In a 98% glycerin serving as a solvent, Sunset Yellow (azo dye) was dissolved at a concentration of 0.02% and the oxide was dispersed at a concentration of 0.067%. The resultant dispersion was placed in a quartz glass cell, and irradiated with a BLB lamp (ultraviolet lamp) with an intensity of 1.65 mW/$cm^2$. The absorbance at 490 nm was measured at regular intervals, and the decreasing rate, $\Delta OD$, (unit:per hour) was obtained. As the value of $\Delta OD$ becomes smaller, the photo-activity is considered to be more restrained.

<Evaluation of Mixed-crystal State>

To identify the mixed-crystal state in the present invention, X-ray photoelectron spectrometry (XPS) is employed. The details are referred to in A.Yu.Stakheev et al, J. Phys. Chem., 97(21), 5668-5672 (1993).

EXAMPLE 1

9.4 $Nm^3$/hour ("N" means standard conditions, and the same meaning applies correspondingly to the following) of gaseous titanium tetrachloride with a concentration of 100 vol. %, and 2.4 $Nm^3$/hour of gaseous silicon tetrachloride with a concentration of 100 vol. % were mixed to prepare a material gas, and preheated to 1000° C. A mixed gas of 8 $Nm^3$/hour of oxygen and 20 $Nm^3$/hour of water vapor was preheated to 1000° C. Both the material gas and the mixed gas were introduced into a reaction tube at respective flow velocities of 49 m/sec and 60 m/sec, using a coaxial parallel flow nozzle. For the reaction, a reaction tube such as shown in FIG. 1 was employed, which reaction tube was provided with a coaxial parallel flow nozzle having an internal tube with a diameter of 20 mm. The mixed halogenated metal containing gas was introduced through the internal tube.

The inner diameter of the reaction tube was 100 mm, and the counted value of the flow velocity in the tube at the reaction temperature of 1,300° C. was 10 m/sec. Cooling air was introduced into the reaction tube after the reaction so that the high-temperature residence time in the reaction tube was 0.3 sec or less. Thereafter, the produced ultrafine particles were collected using a Teflon bag filter. The ultrafine particles were then heated at 500° C. for one hour under atmospheric conditions using an oven, thereby performing a dechlorination process.

With respect to the obtained ultrafine mixed-crystal oxide, the BET specific surface area was 88 $m^2/g$, the average true specific gravity was 3.7 g/cc, the average primary particle diameter was 0.018 μm, and the residual content of chlorine was 0.01%. The titanium-oxygen-silicon bond was apparently confirmed by the XPS.

In addition, the photo-activity (hereinafter referred to as "ΔOD") was 0.1/hr, the BET specific surface area decreasing ratio after completion of the heating at 800° C. for one hour (hereinafter referred to as "ΔB") was 2%, and the ratio of the chlorine content to the BET specific surface area (hereinafter referred to as "A/B") was 0.0001.

EXAMPLE 2

8.3 $Nm^3$/hour of gaseous titanium tetrachloride, 2.4 $Nm^3$/hour of gaseous aluminum trichloride, and 6 $Nm^3$/hour of nitrogen were mixed to prepare a material gas, and preheated to 900° C. A mixed gas of 8 $Nm^3$/hour of oxygen and 20 $Nm^3$/hour of water vapor was preheated to 1000° C. Both the material gas and the mixed gas were introduced into a reaction tube at respective flow velocities of 63 m/sec and 60 m/sec, using a coaxial parallel flow nozzle. For the reaction, a reaction tube such as shown in FIG. 1 was employed, which reaction tube was provided with a coaxial parallel flow nozzle having an internal tube with a diameter of 20 mm. The gas containing mixed halogenated metal was introduced through the internal tube.

The inner diameter of the reaction tube was 100 mm, and the counted value of the flow velocity in the tube at the reaction temperature of 1,200° C. was 10 m/sec. Cooling air was introduced into the reaction tube after the reaction so that the high-temperature residence time in the reaction tube was 0.3 sec or less. Thereafter, the produced ultrafine particles were collected using a Teflon bag filter. The ultrafine particles were then heated at 500° C. for one hour under atmospheric conditions using an oven, thereby performing a dechlorination process.

With respect to the obtained ultrafine mixed-crystal oxide, the BET specific surface area was 48 $m^2/g$, the average true specific gravity was 3.9 g/cc, the average primary particle diameter was 0.032 μm, and the residual content of chlorine was 0.1%. The titanium-oxygen-aluminum bond was apparently confirmed by the XPS.

In addition, the value of ΔOD was 1.2/hr, the value of ΔB was 5%, and the A/B ratio was 0.002.

EXAMPLE 3

1.2 $Nm^3$/hour of gaseous silicon tetrachloride, 8.3 $Nm^3$/hour of gaseous aluminum trichloride, and 10 $Nm^3$/hour of nitrogen were mixed to prepare a material gas, and preheated to 1,000° C. A mixed gas of 8 $Nm^3$/hour of oxygen and 20 $Nm^3$/hour of water vapor was preheated to 1000° C. Both the material gas and the mixed gas were introduced into a reaction tube at respective flow velocities of 80 m/sec and 60 m/sec, using a coaxial parallel flow nozzle. For the reaction, a reaction tube such as shown in FIG. 1 was employed, which reaction tube was provided with a coaxial parallel flow nozzle having an internal tube with a diameter of 20 mm. The gas containing mixed halogenated metal was introduced through the internal tube.

The inner diameter of the reaction tube was 100 mm, and the counted value of the flow velocity in the tube at the reaction temperature of 1,200° C. was 11 m/sec. Cooling air was introduced into the reaction tube after the reaction so that the high-temperature residence time in the reaction tube was 0.3 sec or less. Thereafter, the produced ultrafine particles were collected using a Teflon bag filter. The ultrafine particles were then heated at 500° C. for one hour under atmospheric conditions using an oven, thereby performing a dechlorination process.

With respect to the obtained ultrafine mixed-crystal oxide, the BET specific surface area was 120 $m^2/g$, the average true specific gravity was 3.5 g/cc, the average primary particle diameter was 0.014 μm, and the residual content of chlorine was 0.004%. The silicon-oxygen-aluminum bond was apparently confirmed by the XPS.

In addition, the value of ΔB was 2%, and the A/B ratio was 0.00003.

COMPARATIVE EXAMPLE 1

10.7 $Nm^3$/hour of gaseous titanium tetrachloride and 12 $Nm^3$/hour of nitrogen were mixed to prepare a material gas, and preheated to 900° C. A mixed gas of 8 $Nm^3$/hour of oxygen and 20 $Nm^3$/hour of water vapor was preheated to 1000° C. Both the material gas and the mixed gas were introduced into a reaction tube at respective flow velocities of 86 m/sec and 60 m/sec, using a coaxial parallel flow nozzle. For the reaction, a reaction tube such as shown in FIG. 1 was employed, which reaction tube was provided with a coaxial parallel flow nozzle having an internal tube with a diameter of 20 mm. The gas containing the halogenated metal was introduced through the internal tube.

The inner diameter of the reaction tube was 100 mm, and the counted value of the flow velocity in the tube at the reaction temperature of 1,200° C. was 12 m/sec. Cooling air was introduced into the reaction tube after the reaction so that the high-temperature residence time in the reaction tube was 0.3 sec or less. Thereafter, the produced ultrafine particles were collected using a Teflon bag filter. The ultrafine particles were then heated at 500° C. for one hour under atmospheric conditions using an oven, thereby performing a dechlorination process.

With respect to the obtained ultrafine oxide, the BET specific surface area was 51 $m^2/g$, the average true specific gravity was 4.0 g/cc, the average primary particle diameter was 0.029 μm, and the residual content of chlorine was 0.4%.

In addition, the value of ΔOD was 21/hr, the value of ΔB was 62%, and the A/B ratio was 0.007. This product is found to have higher photo-activity, and to be more easily sintered when compared with the products produced in Examples 1 and 2. In addition, there remains much amount of chlorine.

COMPARATIVE EXAMPLE 2

8.3 $Nm^3$/hour of gaseous aluminum trichloride and 20 $Nm^3$/hour of nitrogen were mixed to prepare a material gas, and preheated to 1,000° C. A mixed gas of 8 $Nm^3$/hour of oxygen and 20 $Nm^3$/hour of water vapor was preheated to 1,000° C. Both the material gas and the mixed gas were introduced into a reaction tube at respective flow velocities of 107 m/sec and 60 m/sec, using a coaxial parallel flow nozzle. For the reaction, a reaction tube such as shown in FIG. 1 was employed, which reaction tube was provided with a coaxial parallel flow nozzle having an internal tube with a diameter of 20 mm. The gas containing the halogenated metal was introduced through the internal tube.

The inner diameter of the reaction tube was 100 mm, and the counted value of the flow velocity in the tube at the reaction temperature of 1,200° C. was 12 m/sec. Cooling air was introduced into the reaction tube after the reaction so that the high-temperature residence time in the reaction tube was 0.3 sec or less. Thereafter, the produced ultrafine particles were collected using a Teflon bag filter. The ultrafine particles were then heated at 500° C. for one hour under atmospheric conditions using an oven, thereby performing a dechlorination process.

With respect to the obtained ultrafine oxide, the BET specific surface area was 115 $m^2/g$, the average true specific gravity was 3.7 g/cc, the average primary particle diameter was 0.014 μm, and the residual content of chlorine was 0.5%.

In addition, the value of ΔB was 7%, and the A/B ratio was 0.004.

This product is found to be more easily sintered and there remains more amount of chlorine when compared with the product produced in Example 3.

EXAMPLE 4

Water is added to the ultrafine mixed-crystal oxide having a titanium-oxygen-silicon bond obtained in example 1, to produce a slurry containing 0.5 mass % of the oxide on the solid powder basis. To the slurry, an aqueous dispersed urethane resin (VONDIC1040NS, produced by DAINIPPON INK AND CHEMICALS, INCOPOORATED.) is added to produce a coating agent containing urethane resin by 70 mass % on the solid powder basis and photo-functional powder.

The obtained coating agent is painted on one side of polyethylene terephthalate(PET) film (100 μm Lumilar T, produced by Toray Industries, Inc) by an applicator(25 μ□). And the resulting film is dried at 80□ for two hours to produce a polyethylene terephthalate film including the ultrafine mixed-crystal oxide.

A percent transmission of the obtained polyethylene terephthalate film is measured by spectrometer(UV-2400PC, produced by Shimazu Co., Ltd) to be 1% (360 nm) and 89% (550 nm).

A light resistance test is conducted to the above described polyethylene terephthalate film by applying a light of 76 $mW/cm^2$ using fademeter (SUNSET CPS+, produced by Heraeus), and coloring of the film after 100 hours is investigated. No coloring is observed.

EXAMPLE 5

20 mass parts of the ultrafine mixed-crystal oxide having a titanium-oxygen-silicon bond obtained in example 1, 2 mass parts of zinc stearate (zinc stearate S, produced by NOF CORPORATION), 78 mass parts of low density polyethylene (LDPE) (JAPAN POLYOLEFINS CO., Ltd.) is melt-kneaded at 160□ (residence time is about 3 minutes) using biaxial extruder (PCM type 30, produced by Ikegai tekkou Co., Ltd.), and foamed to pellet, to produce 20 kg of a cylinder shaped compound of low density polyethylene having a diameter of 2~3 mmφ, a length of 3~5 mm, and a weight of 0.01~0.02 g, containing 20% of the ultrafine mixed-crystal oxide.

1 kg of the obtained compound of low density polyethylene containing the ultrafine mixed-crystal oxide and 39 kg of low density polyethlene (LDPE) (JAPAN POLYOLEFINS CO., Ltd.) are mixed using V-type blender (RKI-40, produced by IKEMOTO SCIENTIFIC TECHNOLOGY CO., LTD) for 10 minutes to produce a mixed pellet.

The obtained mixed pellet is molded using inflation film molding machine equipped with 40 mmφ of extruder (YEI-S40-40L, produced by YOSHIITEKKOU CO., LTD) to produce 4 μ□ of inflation film. Transmission and light resistance tests are conducted to the obtained film in the same procedure as in example 4. The results obtained are shown in Table 1 below.

COMPARATIVE EXAMPLE 3

A purchased ultrafine titanium dioxide (ST-01, produced by ISHIHARA INDUSTRIES CO., LTD.) is treated and tested in the same procedure as in example 4. The results obtained are shown in Table 1 below.

COMPARATIVE EXAMPLE 4

A purchased ultrafine titanium dioxide (ST-01, produced by ISHIHARA INDUSTRIES CO., LTD.) is treated and tested in the same procedure as in example 4. The results obtained are shown in Table 1 below.

TABLE 1

|  | Additives | Application | Light resistance test | % transmission (350 nm) | % transmission (550 nm) |
| --- | --- | --- | --- | --- | --- |
| Example 4 | Ultrafine mixed-crystal oxide containing titanium-oxygen-silicon bond | Painting on PET film | No coloring | 1% | 89% |
| Example 5 | Ultrafine mixed-crystal oxide containing titanium-oxygen-silicon bond | LDPE inflation film | No coloring | 0% | 78% |
| Comparative Example 3 | Ultrafine titanium dioxide | Painting on PET film | Coloring | 3% | 95% |
| Comparative Example 4 | Ultrafine titanium dioxide | LDPE inflation film | Coloring | 10% | 60% |

INDUSTRIAL APPLICABILITY

As previously explained in detail, according to the present invention, there can be provided an ultrafine mixed-crystal oxide comprising the primary particles in a mixed-crystal state, the oxide being in the form of ultrafine particles with excellent dispersion properties, and having a BET specific surface area of 10 to 200 m²/g. This is because the gas containing a mixture of halogenated metals and the oxidizing gas are independently preheated to 500° C. or more prior to the reaction in the vapor phase method for producing an ultrafine mixed-crystal oxide by subjecting the mixture of halogenated metals to high temperature oxidation using the oxidizing gas.

Further, for example, the ultrafine mixed-crystal oxide of the present invention can moderate or control the photoactivity and the sintering properties thereof. The residual amount of chlorine can be drastically decreased. The step of disintegrating of the particles becomes unnecessary, or can be performed using extremely simple facilities if the step is necessary. The ultrafine mixed-crystal oxide can be produced very conveniently. The process for producing an ultrafine mixed-crystal oxide of the present invention is useful for various industrial applications.

What is claimed is:

1. An ultrafine mixed-crystal oxide has a BET specific surface area of about 10 to about 200 m²/g, and, wherein said oxide has a change in absorbance of about 5 (/hr) or less when measured in such a manner that said oxide is dispersed at a concentration of 0.067% in a solvent of a 98% glycerin in which Sunset Yellow is dissolved at a concentration of 0.02%, thereby preparing a dispersion, and said dispersion is irradiated with a BLB lamp (ultraviolet light) with an intensity of 1.65 mW/cm² to obtain said change in absorbance (ΔOD) at 490 nm, and wherein said oxide comprises primary particles in a mixed crystal state with a bond selected from the group consisting of a titanium-oxygen-silicon bond, a titanium-oxygen-aluminum bond, and an aluminum-oxygen-silicon bond.

2. The ultrafine mixed-crystal oxide as claimed in claim 1, wherein said oxide has an A/B ratio of about 0.001 or less when A is the content (%) of chlorine, and B is the BET specific surface area (m²/g).

3. The ultrafine mixed-crystal oxide as claimed in claim 1, wherein said oxide comprises primary particles with a mixed crystal having a titanium-oxygen-silicon bond.

4. The ultrafine mixed-crystal oxide as claimed in claim 1, wherein said oxide has a BET specific surface area decreasing ratio of about 10% or less after heated at about 800° C. for one hour.

5. An ultrafine mixed-crystal oxide composition characterized by comprising the ultrafine mixed-crystal oxide as claimed in claim 1.

6. An aqueous slurry characterized by comprising the ultrafine mixed-crystal oxide as claimed in claim 1.

7. An organic polymer composition characterized by comprising the ultrafine mixed-crystal oxide as claimed in claim 1.

8. A paint comprising the organic polymer composition as claimed in claim 7.

9. A master batch for a molded material selected from fiber, film or molded plastic, comprising the organic polymer composition as claimed in claim 7, containing the ultrafine mixed-crystal oxide in a high concentration.

10. A molded material characterized in that the molded material is molded from the organic polymer composition as claimed in claim 7.

11. The molded material as claimed in claim 10, wherein the molded material is a fiber, a film, or a plastic molded material.

12. A coating composition for a structural material selected from wall material, glass, signboard, concrete for construction of the road, paper, plastics, fabric, wood and vehicle, which comprises the organic polymer composition as claimed in claim 7.

13. A pigment comprising the ultrafine mixed-crystal oxide as claimed in claim 1.

14. A dielectric raw material comprising the ultrafine mixed-crystal oxide as claimed in claim 1.

15. A cosmetic comprising the ultrafine mixed-crystal oxide as claimed in claim 1.

16. A clothing comprising the ultrafine mixed-crystal oxide as claimed in claim 1.

* * * * *